United States Patent Office 3,459,566
Patented Aug. 5, 1969

3,459,566
PROCESS FOR PRODUCING SILICON CARBIDE ARTICLES EMPLOYING PYROMELLITIC DIANHYDRIDE-LIMONENE DIOXIDE MIXTURE
Bonum S. Wilson, Jr., Youngstown, and Carl von Doenhoff, Niagara Falls, N.Y., assignors to The Carborundum Company, Niagara Falls, N.Y., a corporation of Delaware
No Drawing. Filed Jan. 3, 1967, Ser. No. 606,563
Int. Cl. C04b 35/56
U.S. Cl. 106—44                            11 Claims

ABSTRACT OF THE DISCLOSURE

Dense, self-bonded articles consisting essentially of silicon carbide may be produced according to prior art methods by forming a compact, with the aid of a temporary carbonizable binder, of silicon carbide and carbon and siliconizing the same to convert the carbon to silicon carbide. The use of a reactive mixture of limonene dioxide, pyromellitic dianhydride and a suitable catalyst to form the temporary binder in such methods results in an improvement by avoiding the occurrence of cracks which form when the prior processes are employed to make large, intricate articles.

---

This invention relates to a new and improved process for the production of dense, self-bonded silicon carbide articles.

Silicon carbide exhibits unique refractory properties, and refractory products incorporating silicon carbide have long been known. In many such products, a ceramic material is incorporated as a bonding agent for the silicon carbide, but these ceramic bonding agents often possess comparatively inferior refractory properties which may interfere with full utilization of the superior refractory properties of the silicon carbide. Accordingly, there has been much interest in the development of methods for producing high density, self-bonded articles composed substantially entirely of silicon carbide, obviating the need for and disadvantages of ceramic bonds, and several methods have been reported in recent years for the production of such articles. The basic approach of these methods involves forming a compact, i.e., a dense, cohesive body, of silicon carbide and carbon converting the carbon therein to silicon carbide by siliconizing the compact, i.e., heating it in the presence of silicon under conditions such that the silicon penetrates the compact and reacts with the carbon therein to form silicon carbide, the newly formed silicon carbide bonding to the initial silicon carbide to form a dense, self-bonded silicon carbide body. The source of the silcon may be either elemental silicon or a silicon compound decomposable by heat.

One such method is described in U.S. Patent 3,205,043 to Taylor. According to this method, a mixture of granular silicon carbide and a temporary binder such as a phenolic resin or dextrin is formed into a body of the desired and heated to form a porous silicon carbide body. The porous body is impregnated with a carbonizable material such as a furfuryl compound or phenolic resin and subjected to heat or a suitable chemical treatment to carbonize the carbonizable material and form a silicon carbide-carbon compact. Upon heating the compact in a silicon-supplying environment the carbon is converted to silicon carbide and a dense, self-bonded silicon carbide body is formed. In the event that a sufficiently high density is not obtained, the body may be re-impregnated with carbonizable material which is then carbonized and siliconized to increase the amount of interstitial silicon carbide.

U.S. Patent 2,907,972 to Schildhauer et al. and U.S. Patent 2,938,807 to Andersen describe methods which simplify the process of Taylor by incorporating carbon in the initial mixture, thus rendering unnecessary the initial formation of a porous silicon carbide body and impregnation thereof with a carbonizable material. According to the methods described, a mixture is prepared consisting of granular silicon carbide, a carbonaceous material, i.e., graphite or another form of carbon, and a carbonizable temporary binder such as thermo setting synthetic resin, with or without additional carbonizable materials. The mixture is formed into a green body of the desired shape by pressing, extending or other means and setting the temporary binder. The greenbody is heated to carbonize the binder and other carbonizable material present and siliconized, whereby a self-bonded body consisting essentially of silicon carbide and having a density of at least 3.00 g.cc. is formed.

A variety of useful articles may be formed by the above-mentioned methods. For example, an initial mix consisting of silicon carbide, graphite and a phenolic resin may be cold pressed in a cylindrical mold to form a disk-shaped green body which, upon completion of processing, results in a silicon carbide disk. Furthermore, the disk-shaped green body, after heat setting the phenolic resin, has sufficient green strength to permit its being machined. Thus the green body may be drilled to form a perforated disk, or portions of the circumference of the disk may be removed to form a polygonal shape, or the disk may otherwise be machined to any desired configuration; and upon completion of processing a dense, self-bonded silicon carbide replica of such configuration is formed.

While the above-mentioned methods have been proven useful for the fabricating of comparatively thin green bodies and configurations derived therefrom by machining, formidable difficulties are encountered in attempting to scale up such processes to produce comparatively large, thick, three-dimensional green bodies from which it is possible to form large and intricate silicon carbide articles. Although it is quite feasible to cold press suitable green bodies having a thickness of the order of an inch, as the thickness is increased the resulting green body becomes increasingly likely to develop cracks, and while this phenomenon may only occasionally be encountered in cold pressing a green body three inches thick it almost invariably occurs in pressing a body five inches thick. Repeated attempts to cold press suitable green bodies having a substantially greater thickness have proven unsuccessful. On some occasions, the cracks may be observed in the cold pressed body, while on other occasions, even though no cracks appear in the cold pressed body, they are readily apparent in the body after curing the resin.

Numerous theories may be advanced as possible explanations for the cracks which form in large green bodies prepared according to the described prior art methods. For example, it might be postulated that air entrapped in the initial mix could produce laminar cracks or stress during the cold pressing operation because of the absence of means for its removal during pressing. However, the application of vacuum to the mold during cold pressing in an attempt to remove any air which might be entrapped does not eliminate cracking, although some improvements may be observed. No other theory which has been investigated has been able to pinpoint any single factor to which the cracking may be attributed, and no theory is here advanced as to the factor or factors which may be responsible for this cracking. However, the improved method of the present invention renders it possible to produce crack free green bodies which are suitable for the formation of dense, self-bonded silicon carbide articles of substantially larger size than those heretofore obtainable by the methods described.

It is therefore an object of the present invention to provide an improved process for the formation of compacts of silicon carbide and carbon which may be reacted with silicon to form dense bodies consisting essentially of silicon carbide.

It is a further object of this invention to provide an improved process for the formation of dense, self-bonded silicon carbide bodies of substantially larger size than those obtainable by methods heretofore described.

The present invention contemplates the use, as the temporary binder forming material in initial mixtures of the type described in the patents mentioned hereinbefore for the formation of dense, self-bonded silicon carbide articles, of a resin forming material comprising a reactive mixture of limonene dioxide, pyromellitic dianhydride, and a suitable catalyst for the polymerization thereof. The use of such a reactive mixture, the ingredients of which will react to form a resin, as the temporary binder forming material in processes of the type described in the above-mentioned patents unexpectedly permits the production of green bodies which are not as subject to cracking as those heretofore obtainable by such methods, and permits the formation of larger crack-free green bodies than those hitherto obtainable, which may be further processed to form dense, self-bonded silicon carbide bodies of comparatively large size and complex shapes.

invention, a mixture of silicon carbide, a carbonaceous material, and a resin forming material comprising a reactive mixture of limonene dioxide, pyromellitic dianhydride, and a suitable catalyst, preferably melamine, is prepared, the proportions of each ingredient being based upon considerations which will be described in greater detail hereinafter. A suitable quantity of the raw mix thus produced is formed into the desired shape by any suitable method, for example, by cold pressing the mix in a mold, and the mix is retained in the desired shape for a time sufficient to permit the resin to set, thus forming a green body of the desired shape. The green body may then be machined, if necessary, to form a piece of any desired configuration, then subjected to sufficient heat to carbonize the binder, and finally siliconized according to known methods to form a dense, self-bonded article consisting essentially of silicon carbide. It is often desired to subject the green body to a "post curing" cycle prior to machining to further advance the polymerization and enhance the strength and uniformity of the green body, such post curing generally being hastened by a somewhat elevated temperature.

EXAMPLE 1

A blend is prepared of the following ingredients: 62.5 kg. of silicon carbide (SiC) having a median particle size of 102μ with a range of 68–137μ; 29.5 kg. of SiC having a median particle size of 66μ with a range of 42–97μ; 16.3 kg. of SiC having a median particle size of 19μ with a range of 4–36μ; 16.3 kg. of SiC having a median particle size of 11μ with a range of 2–28μ; and 23.7 kg. of graphite having a particle size of less than 45 microns. To the blend is added a mixture of 12.128 l. of limonene dioxide, 2475.0 g. of pyromellitic dianhydride and 247.5 g. of melamine. After mixing for about 20 minutes to achieve uniformity the resulting mix is passed through a 20 mesh screen to break up any agglomerates.

To prepare a cylinder having a diameter of 18 in. (45.72 cm.) and a height of 16 in. (40.64 cm.), a mold is selected having a cavity with a diameter of 18 in. (45.72 cm.) fitted with a top and a bottom plunger. The mold cavity is loaded with 146.7 kg. of the mix, this quantity being computed as that amount necessary to result in a density in the pressed body of 2.20 g./cc. The mold and contents are placed in a suitable hydraulic press having upper and lower rams which cooperate, respectively, with the top and bottom plungers of the mold, the apparatus being provided with means to evacuate the mold cavity to aid in the removal of any air entrapped in the mix. Vacuum is applied and the mix is compressed by actuating the top and bottom plungers to the desired height of 16 in., a pressure of 1300 p.s.i. (about 90 kg./cm.²) being just sufficient to achieve this. The vacuum is then released, but the pressure is maintained for about 12 hours. During this time the resin sets to such an extent that the green body, upon removal from the mold, retains its pressed shape and is devoid of cracks. The body is then placed in an oven at 80° C. for 12 hours as a post curing treatment during which the resin is further polymerized to form a still more durable crack-free green body.

The green body is subjected to conventional machining employing diamond tooling to form a piece having a height of 16 in. and a uniform cross section throughout this height, The cross section being a regular hexagon with each side thereof 9 in. (22.86 cm.) long. A diamond drill is then employed to drill the hexagonal piece to form therein a multiplicity of regularly spaced holes one inch in diameter through the piece parallel to the 16 in. axis thereof, the holes being 0.75 in. (1.9 cm.) apart.

The piece is placed in an oven, heated to 50° C. and the temperature is increased at the rate of 15° C. per hour to 175° C. where it is held for 12 hours. The temperature is then further increased at the rate of 15° C. per hour to 285° C. where it is held for 24 hours. During this heating cycle carbonization of the resin proceeds to such an extent that only about 30 percent of the volatilizable portion thereof remains.

In siliconizing the piece it is placed on a porous carbon support in a vertical induction furnace and graphite crucibles containing silicon in granular form are placed throughout the furnace at appropriate locations with regard to the geometry of the furnace and of the piece so that all sections of the piece will be contacted by silicon vapor. While maintaining a nitrogen atmosphere in the furnace the temperature is brought to 2000–2300° C. and held for about 4 hours. As the temperature rises carbonization of the resin is completed and thereafter the silicon volatilizes and reacts with the carbon present in the piece to form interstitial silicon carbide, resulting in a virtually nonporous, self-bonded silicon carbide body which is suitable for use as a heat exchanger element and which has the following properties: specific gravity, 3.10 g./cc.; modulus of rupture (21° C.), approximately 17,000 p.s.i. (approximately 1200 kg./cm.²); compressive strength (21° C.), approximately 150,000 p.s.i. (approximately 10,550 kg./cm.²).

EXAMPLE 2

A blend is prepared consisting of 159.7 kg. of SiC having a median particle size of 102μ with a range of 68–137μ; 75.3 kg. of SiC having a median particle size of 66μ with a range of 42–97μ; 41.7 kg. of SiC having a median particle size of 19μ with a range of 4–36μ; 41.7 kg. of SiC having a median particle size of 11μ with a range of 2–28μ; and 60.8 kg. of graphite having a particle size of less than 45 microns. To the blend is added a mixture of 30.73 l. of limonene dioxide, 6.275 kg. of pyromellitic dianhydride and 627.5 g. of melamine. After mixing for 40 min. to insure uniformity and the resulting mix is passed through a 20 mesh screen to break up any agglomerates. A mold having a diameter of 29 in. (73.66 cm.) is employed for the production of a green body having a diameter of 29 in. and a height of 16 in. (40.64 cm.), 380.7 kg. of the mix being used. Pressing is carried out substantially as in Example 1 to form a resin bonded green body having a density of about 2.20 g./cc. Post curing of the resin is carried out at 80° C. for a period of 24 hours. The green body is machined to form a piece of the same configuration as that prepared in Example 1 having a height of 16 in. and a cross section in the shape of a regular hexagon with each side 14.5 in (36.8 cm.) in length.

The piece is placed in an oven, heated to 100° C., and the temperature is increased from 100 to 260° C. over a period of 50 hours, the average rate of temperature increase being about 3° per hour. During this heating cycle, carbonization of the resin proceeds, leaving only about 40 percent of the volatilizable portion thereof. The piece is siliconized substantially in accordance with the procedure described in Example 1 to obtain a dense, self-bonded silicon carbide article having the same configuration as the machined green body, and which is suitable for use as a heat exchanger element.

Since the essence of the present invention resides primarily in the particular resin employed as the temporary binder in known processes for the production of dense, self-bonded silicon carbide articles, it will be apparent to those skilled in the art that most of the considerations bearing upon the previously known and reported processes will find equal applicability in the process of the present invention. For example, no specific grade or variety of silicon carbide is essential, although it will usually be preferred to employ relatively pure silicon carbide; the particle size of the silicon carbide does not appear to be critical although mixtures of different grit sizes may generally be employed advantageously, as in the examples, to reduce to a minimum the total volume of the spaces between the silicon carbide particles; and while the graphite employed in the examples is very fine, coarser material can be employed, and other forms of carbon may be used in whole or in part as a substitute for graphite if desired. The particle sizes and proportions of silicon carbide and graphite employed in the examples result in a highly desirable mix for the formation of dense articles. The proportion of carbon to silica carbide in the mix may be based upon the considerations set forth in the prior art patents referred to above. In computing the amount of carbon, the carbon which is formed by carbonization must, of course, be taken into account.

With regard to the proportions of ingredients in the resin forming material, it has been found that mixtures in the approximate proportions of 100 g. of limonene dioxide to 20 g. of pyromellitic dianhydride to 2 g. of melamine are especially effective although quite satisfactory results are obtained with mixtures in the proportions of 100 g. of limonene dioxide to about 10–30 g. of pyromellitic dianhydride and about 1–3 g. of melamine. Marked variation from these proportions incurs the risk of failure of the resin to set or of a reaction which proceeds so violently that spontaneous ignition may result. The amount of resin forming material employed should be at least sufficient to result, upon curing the resin, in a crack-free bonded body having sufficient strength to be handled and machined. While the amount of resin forming material employed in the examples is approximately 10 percent of the weight of the silicon carbide and graphite, as little as about 6 percent is often sufficient, especially for somewhat smaller bodies, and amounts of 15 percent or more can sometimes be employed. In general, however, it will be preferred to employ the minimum amount of resin forming material which will serve to impart sufficient green strength for the purpose, thereby minimizing the porosity of the volatile portion thereof, and the amount employed in the examples is approximately optimum for the materials used and the bodies formed therein.

In preparing the raw mix it is preferred to prepare a blend of the silicon carbide and carbon and to prepare the resin forming material separately, first mixing the pyromellitic dianhydride and the catalyst and then adding the limonene dioxide thereto. The resin forming material may then be added to the silicon carbide-carbon blend. The resin begins to polymerize immediately upon mixing the ingredients thereof together, this reaction proceeding exothermically, and since the reaction rate increases with increasing temperature it is highly desirable to employ means such as cooling coils to aid the dissipation of heat while preparing the resin forming material, thus increasing its pot life.

The amount of mix to be employed may readily be computed from the volume of the green body to be formed and the desired density thereof. When employing mixes of the compositions described in the examples, it has been found that a density of about 2.2 g./cc. in the green body is approximately the optimum density with a view toward obtaining a carbonized body which can be siliconized to form a high density carbide body.

Although, as is indicated in the examples, it is preferred to cold press the mixture used to form green bodies in carrying out the present invention, other known processes can be employed. The pressing procedure employed is substantially in accordance with known pressing methods and the pressure used is determined by the density desired in the green body. Preferably, but not necessarily, entrapped air is removed from the mix during pressing by the use of vacuum.

The body after pressing may have sufficient green strength to permit whatever handling and machining may be required for the particular purpose at hand. If not, however, the green strength of the cold pressed body may be increased, as described above, by post curing the resin, preferably by heating the body to temperatures in the range from about 65° C. to 95° C.

The green body may be machined into a piece of any desired configuration by conventional techniques employing standard equipment which preferably is provided with diamond cutting elements. Thus, for example, diamond drills may be used to core drill the piece and lathes, band saws, abrasive wheels and the like may be employed to produce such shapes as will suit the final pieces for their intended use.

The green body, in its desired final shape, may be carbonized and siliconized by conventional methods. In carbonization uncontrolled heating during the carbonization may result in such rapid volatilization of the resin by-products that cracks appear in the piece. It is therefore generally preferred to subject the piece to a controlled temperature cycle, gradually increasing the temperature to bring about a slow dissipation of the volatiles from the resin. During the carbonization cycle some 50–75 percent of the volatilizable portion of the resin is removed and the resulting increase in porosity of the piece facilitates dissipation of the remaining volatiles from the piece during the subsequent more intense heating in the siliconizing furnace. In the siliconizing step a temperature in the range from about 2000° C.–2300° C. may be employed. The specific temperature and the time of siliconizing will, of course, vary with such factors as the size and density of the piece.

Articles formed according to the method of this invention will be found to have properties which in general compare favorably with silicon carbide bodies formed according to analogous prior art methods, for example, a compressive strength in the range of about 130,000–200,000 p.s.i. (about 9,000–14,000 kg./cm.$^2$) at room temperature, virtual lack of porosity, a modulus of rupture at room temperature in the range of about 16,000–20,000 p.s.i. (about 1100–1400 kg./cm.$^2$) and a specific gravity in the range of about 3.08–3.13 g./cc., with a substantially impervious structure. The bodies consist essentially of self-bonded silicon carbide although free silicon may be present to the extent of about 10 percent. The silicon content in general does not substantially detract from the utility of bodies formed according to the method of the present invention.

Dense, self-bonded articles produced by the process of this invention are eminently suitable for refractory applications, especially those where hardness, wear resistance and chemical inertness are advantageous. Typical applications include, for example, vessels and piping for corrosive materials, crucibles, rocket nozzles, thermocouple protection tubes, sandblasting nozzles, heating elements, perforated heat exchanger parts and the like.

Except as otherwise specified, all reference herein to percentages are intended to mean percentages by weight;

references to mesh sizes are to U.S. Standard Sieve sizes.

We claim:
1. A crack-free green body comprising silicon carbide, a carbonaceous material, and a carbonizable binder consisting of the reaction product of a mixture of limonene dioxide, pyromellitic dianhydride and melamine, said green body being machinable to a desired configuration and suitable for the formation of a silicon carbide-carbon compact which may be siliconized to form a dense, self-bonded article consisting essentially of silicon carbide.

2. A green body as defined in claim 1 wherein said carbonaceous material is graphite.

3. A green body as defined in claim 1 wherein said carbonizable binder is formed from a mixture consisting essentially of about 100 parts by weight of limonene dioxide, from about 10 to about 30 parts by weight of pyromellitic dianhydride, and from about 1 to about 3 parts by weight of melamine.

4. A green body as defined in claim 1 wherein said carbonizable binder is formed from a mixture consisting essentially of about 100 parts by weight of limonene dioxide, about 20 parts by weight of pyromellitic dianhydride, and about 2 parts by weight of melamine.

5. A green body as defined in claim 1 wherein said mixture of limonene dioxide, pyromellitic dianhydride and melamine constitutes from about 6 to about 15 percent of the total weight of other materials employed in preparing said green body.

6. A raw mix for the preparation of a green body as defined in claim 1 comprising silicon carbide, a carbonaceous material, and a resin forming material consisting essentially of limonene dioxide, pyromellitic dianhydride and melamine, said resin forming material being present in sufficient quantity to provide a resin binder.

7. A raw mix as defined in claim 6 wherein said carbonaceous material is graphite.

8. A raw mix as defined in claim 6 wherein said resin forming material consists essentially of about 100 parts by weight of limonene dioxide, from about 10 to about 30 parts by weight of pyromellitic dianhydride, and from about 1 to about 3 parts by weight of melamine.

9. A raw mix as defined in claim 6 wherein said resin forming material consists essentially of about 100 parts by weight of limonene dioxide, about 20 parts by weight of pyromellitic dianhydride, and about 2 parts by weight of melamine.

10. A raw mix as defined in claim 6 wherein said resin forming material constitutes from about 6 to about 15 percent of the other materials.

11. A process of forming a green body as defined in claim 1 which comprises forming and shaping a mixture of silicon carbide, a carbonaceous material and a carbonizable temporary binder-forming material and setting said binder-forming material, in which said binder-forming material consists essentially of a mixture of limonene dioxide, pyromellitic dianhydride and melamine.

References Cited
UNITED STATES PATENTS 3,275,722   9/1966   Popper _____ 106—44 X HELEN M. McCARTHY, Primary Examiner W. R. SATTERFIELD, Assistant Examiner U.S. Cl. X.R.

23—208; 106—218, 241; 252—516; 260—37, 78; 264—29